US005377812A

United States Patent [19]

Oohara

[11] Patent Number: 5,377,812

[45] Date of Patent: Jan. 3, 1995

[54] APPARATUS FOR ORIENTATING AND FEEDING ROD-LIKE OBJECTS

[75] Inventor: Hiromitsu Oohara, Tokyo, Japan

[73] Assignee: Japan Tobacco Inc., Tokyo, Japan

[21] Appl. No.: 145,186

[22] Filed: Nov. 3, 1993

[30] Foreign Application Priority Data

Nov. 5, 1992 [JP] Japan ................................ 4-296052

[51] Int. Cl.$^{6}$ ................................ B65G 47/12

[52] U.S. Cl. ................................ 198/455; 198/533

[58] Field of Search ............... 198/454, 455, 533, 534, 198/622, 624

[56] References Cited

U.S. PATENT DOCUMENTS

| | | | |
|---|---|---|---|
| 1,984,808 | 12/1934 | Popov . | |
| 3,305,128 | 2/1967 | Dearsley | 198/455 X |
| 3,311,008 | 3/1967 | Schubert | 198/455 X |
| 4,063,633 | 12/1977 | Hall | 198/455 |
| 4,785,928 | 11/1988 | Hinchcliffe et al. | 198/454 X |

FOREIGN PATENT DOCUMENTS

| | | | |
|---|---|---|---|
| 316393 | 12/1919 | Germany | 198/454 |
| 59-198963 | 11/1984 | Japan . | |
| 782792 | 9/1957 | United Kingdom . | |
| 1137826 | 12/1968 | United Kingdom . | |
| 2249772 | 5/1992 | United Kingdom . | |

*Primary Examiner*—D. Glenn Dayoan

[57] ABSTRACT

An entrance opening, i.e., the upper end of an orientation passage, is open in the bottom of a hopper, and the upper portion of the orientation passage is tapered. A pair of entrance agitator rollers are located on the opposite sides of the entrance opening of the orientation passage, and a central agitator roller is located above the entrance agitator rollers. A rotating mechanism rotates the agitator rollers such that the entrance agitator rollers are rotated in the same direction and the central agitator roller is rotated in the direction opposite to the rotating direction of the entrance agitator rollers. The rod-like objects in the hopper are set in the floated condition by the agitator rollers, and are fed into the orientation passage reliably and smoothly.

15 Claims, 4 Drawing Sheets

APPARATUS FOR ORIENTATING AND FEEDING ROD-LIKE OBJECTS

BACKGROUND OF THE INVENTION

1. Field of the Invention

The present invention relates to an apparatus for orientating rod-like objects, such as cigarettes, and feeding them in the orientated state. More particularly, the present invention relates to an apparatus for orientating a large number of rod-like objects contained in a hopper at random and feeding the rod-like objects in the orientated state.

2. Description of the Related Art

In general, a tobacco wrapping apparatus for producing cigarettes (i.e., rod-like objects) is provided with an apparatus which orientates the cigarettes and feeds them in the orientated state. The tobacco wrapping apparatus comprises a hopper in which a large number of cigarettes are contained at random. A substantially-vertical orientation passage is connected to the hopper, and the upper end of the orientation passage is open in the bottom of the hopper. The orientation passage has a width slightly greater than the diameter of the cigarettes. The cigarettes drop from the hopper into the orientation passage, due to the weight of the cigarettes, and are then fed through the orientation passage while being orientated in the same direction. An arrangement drum is located at the lower end of the orientation passage. The arrangement drum receives, one by one, the cigarettes fed in the orientated state, and arranges them in a predetermined way.

Since the width of the orientation passage is only slightly greater than the diameter of the cigarettes, the cigarettes are likely to jam at the upper end of the orientation passage. This cigarette jam is generally referred to as a "bridge phenomenon" since it is caused by a number of horizontally-orientated cigarettes which are stacked one upon another as if they were stone blocks of an arched bridge. If the bridge phenomenon occurs, the cigarettes in the hopper cannot drop into the orientation passage. The bridge phenomenon is likely to occur particularly in an apparatus adapted to feed cigarettes at high speed.

The bridge phenomenon described above is not the only cause of the cigarettes being prevented from dropping into the orientation passage. That is, when the cigarettes drop through the orientation passage, they may be caught on the wall surface of the orientation passage, thus clogging the orientation passage.

In order to solve the problems, the prior art of the present invention arranges a pair of agitator rollers in the open upper end of the orientation passage and rotates each of the agitator rollers alternately in the normal and reverse directions. With the agitator rollers rotated in this manner, the cigarettes are forcibly guided into the orientation passage.

In addition to the agitator rollers, the prior art to the present invention arranges another pair of agitator rollers or agitator vanes inside the hopper such that the second pair of agitator rollers or vanes are located above the open upper end of the orientation passage. To agitate the cigarettes on the bottom of the hopper, each of the second pair of agitator rollers or vanes is alternately rotated in the normal and reverse directions, thus preventing the occurrence of the bridge phenomenon.

Problems to Be Solved by the Invention

Since the agitator rollers or vanes described above are rotated alternately in the normal and reverse directions, the mechanism for driving them requires a rack and a pinion and is inevitably complex in structure. In addition, the driving mechanism generates vibration and noise. Further, since the driving mechanism cannot drive the agitator rollers or vanes at high speed, the feed speed of cigarettes is restricted.

When the cigarettes drop through the orientation passage, they may temporarily jam at the upper end of the orientation passage or at an intermediate point thereof. If this happens, a gap is produced between the stationary cigarettes and the already-fed cigarettes. After a certain time, the stationary cigarettes drop, with their tip ends directed downward or upward, and collide against the already-fed cigarettes. At the time of collision, shredded tobacco scatters from the tip ends of the cigarettes on impact. Such shredded tobacco are undesirably contained in cigarette packages, impairing the commercial value. Moreover, if the stationary cigarettes drop, with their tip ends directed in a direction greatly different from the originally-orientated direction, they adversely affect a smooth flow of subsequent cigarettes and sometimes clog the orientation passage.

SUMMARY OF THE INVENTION

The present invention has been conceived in an effort to solve the above problems, and its object is to provide rod-like object orientation/feeding apparatus which is free of the problems mentioned above, i.e., an apparatus which is capable of orientating and feeding rod-like objects at high speed and in a reliable manner and which prevents the orientation passage from being clogged and prevents a gap from being produced between the cigarettes that are fed through the orientation passage.

To achieve this object, the present invention provides an apparatus of the following structure:

The apparatus of the present invention comprises a hopper containing rod-like objects (e.g., cigarettes) at random. An orientation passage, through which the rod-like objects are fed while being orientated in the same direction, is connected to the hopper, and an entrance at the upper end of the orientation passage is open in the bottom of the hopper. The width of the orientation passage is greatest at the entrance opening, and gradually decreases from the entrance opening to the lower end. A pair of rotatable entrance agitator rollers are located on the opposite sides of the entrance opening of the orientation passage, and a rotatable central agitation roller is arranged in the lower region of the interior of the hopper such that it is located above the entrance agitator rollers. The apparatus comprises as a rotating mechanism which rotates the entrance agitation rollers in the same direction and rotates the central agitation roller in the opposite direction to that of the entrance agitation rollers.

The apparatus of the present invention operates as follows:

The entrance agitator rollers, located on the opposite sides of the entrance opening at the upper end of the orientation passage, are rotated in the same direction. Therefore, the rod-like objects in the neighborhood of the entrance opening are guided toward the entrance opening by one of the entrance agitator rollers, and are raised away from the entrance opening by the other of the entrance agitator rollers. Since two rod-like objects are prevented from being simultaneously fed to the entrance opening, the rod-like objects can be smoothly fed into the orientation passage. The central agitator roller, located above the entrance agitator rollers, is rotated in the opposite direction to that of the entrance agitator rollers. Therefore, the rod-like objects located between the central agitator roller and the entrance agitator rollers are guided in the same direction, with the result that the rod-like objects located in the lower region of the interior of the hopper are circulated around the central agitator roller. Since the rod-like objects flow smoothly in the lower region of the hopper, the occurrence of the bridge phenomenon is reliably prevented. Accordingly, the rod-like objects can be fed into the orientation passage smoothly and reliably.

The width of the orientation passage is greater than the diameter of the rod-like objects at the entrance opening and gradually decreases from the entrance opening to the lower end. In short, the orientation passage is tapered. With this structure, the rod-like objects move through the orientation passage in a zigzag fashion at first, and then their horizontal movement is gradually restricted until they move in a straight line. Per unit length, the orientation passage contains a larger number of rod-like objects in the portion where the rod-like objects move in a zigzag fashion than in the portion where the rod-like objects move in a straight line. Therefore, even if the rod-like objects temporarily jam at the entrance opening of the orientation passage or at an intermediate point thereof, what is caused thereby is merely a change in the manner in which the rod-like objects move, that is, the rod-like objects that are moving in the zigzag fashion before the occurrence of the jam begin to move in a straight line. In other word, no gap is produced between the rod-like objects moving through the orientation passage, and the free fall of the rod-like objects is prevented. In the case where the rod-like objects are cigarettes, the shredded tobacco is prevented from scattering. In addition, since the rod-like objects do not fall or direct their tip ends in a direction greatly different from the originally-orientated direction, the orientation passage is prevented from being clogged.

The entrance agitator rollers are continuously rotated in the same direction, and the central agitator roller is also continuously rotated in the same direction. Therefore, the mechanism for rotating the agitator rollers is simple in structure, does not cause vibration or noise, and can rotate the agitator rollers at high speed. In association with the above-mentioned advantage that the rod-like objects can be reliably fed, the apparatus of the present invention can orientate and feed rod-like objects at a higher speed than the conventional type of apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will now be described with reference to the drawings. The embodiment is a cigarette orientation/feeding apparatus for use in a tobacco wrapping apparatus. The summary of the embodiment will be first explained, referring to FIG. 1.

Figure 1:
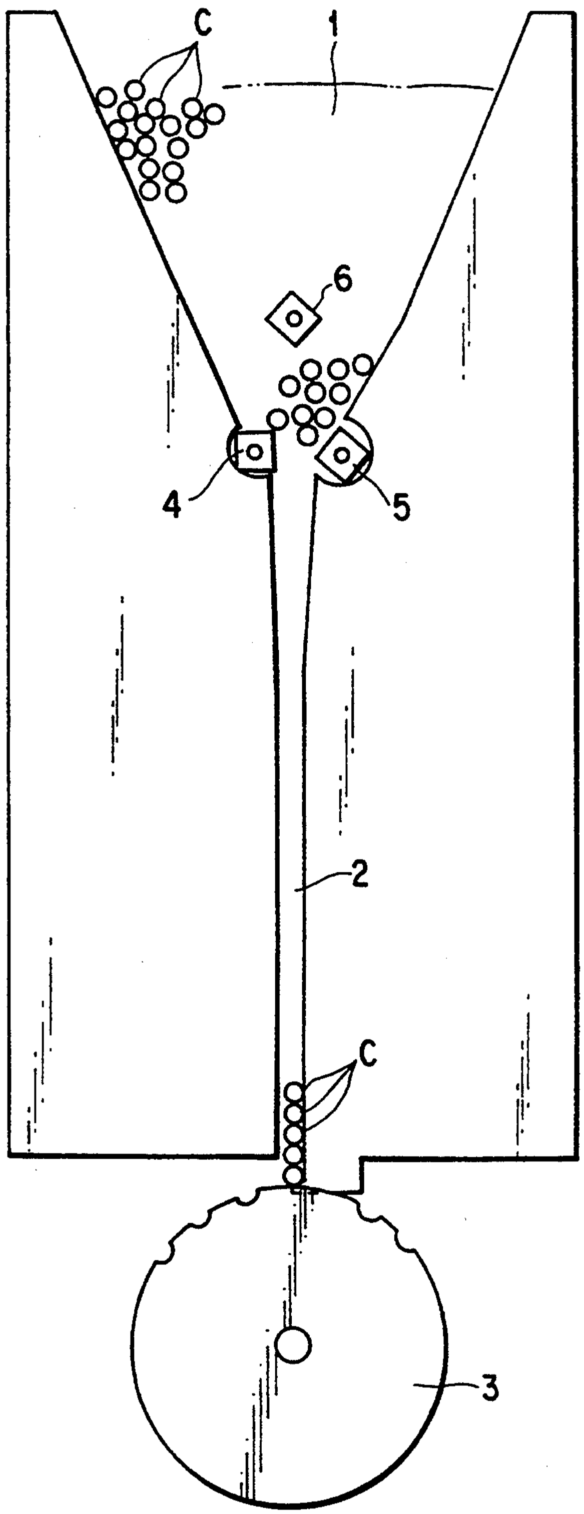
FIG. 1 is a schematic front view showing an apparatus according to one embodiment of the present invention.

In FIG. 1, reference numeral 1 denotes a hopper. The hopper 1 is substantially funnel-shaped, and the hopper's width which is perpendicular to the drawing sheet of FIG. 1 corresponds to the length of cigarettes C. Within the hopper 1, a large number of cigarettes C are contained at random through they are parallel to one another.

An entrance at the upper end of an orientation passage 2 is open in the lower section of the hopper 1. Cigarettes C are fed from the hopper 1 to the orientation passage 2 by utilization of the weight of each cigarette C, and cigarettes C entering the orientation passage 2 are fed downward while being orientated in one straight line.

An arrangement drum 3 is located at the lower end of the orientation passage 2. The arrangement drum 3 is rotated at the predetermined speed, receives cigarettes C one by one from the lower end of the orientation passage 2, and sucks and holds the received cigarettes C in grooves formed in the circumferential surface of the drum 3. The cigarettes C are then transferred from the arrangement drum 3 to another mechanism, by which the cigarettes C are packaged in the orientated state in units of twenty cigarettes, for example.

Inside the hopper 1, a pair of entrance agitator rollers 4 and 5 are located on the opposite sides of the entrance opening of the orientation passage 2. A central agitation roller 6 is also arranged in the lower region of the interior of the hopper 1 such that the central agitator roller 6 is located above the entrance agitator rollers 4 and 5. The agitator rollers 4, 5 and 6 are rotated by a rotating mechanism 20. Due to the rotations of the agitator rollers 4, 5 and 6, the cigarettes C in the hopper 1 are guided into the orientation passage 2.

Figure 2:
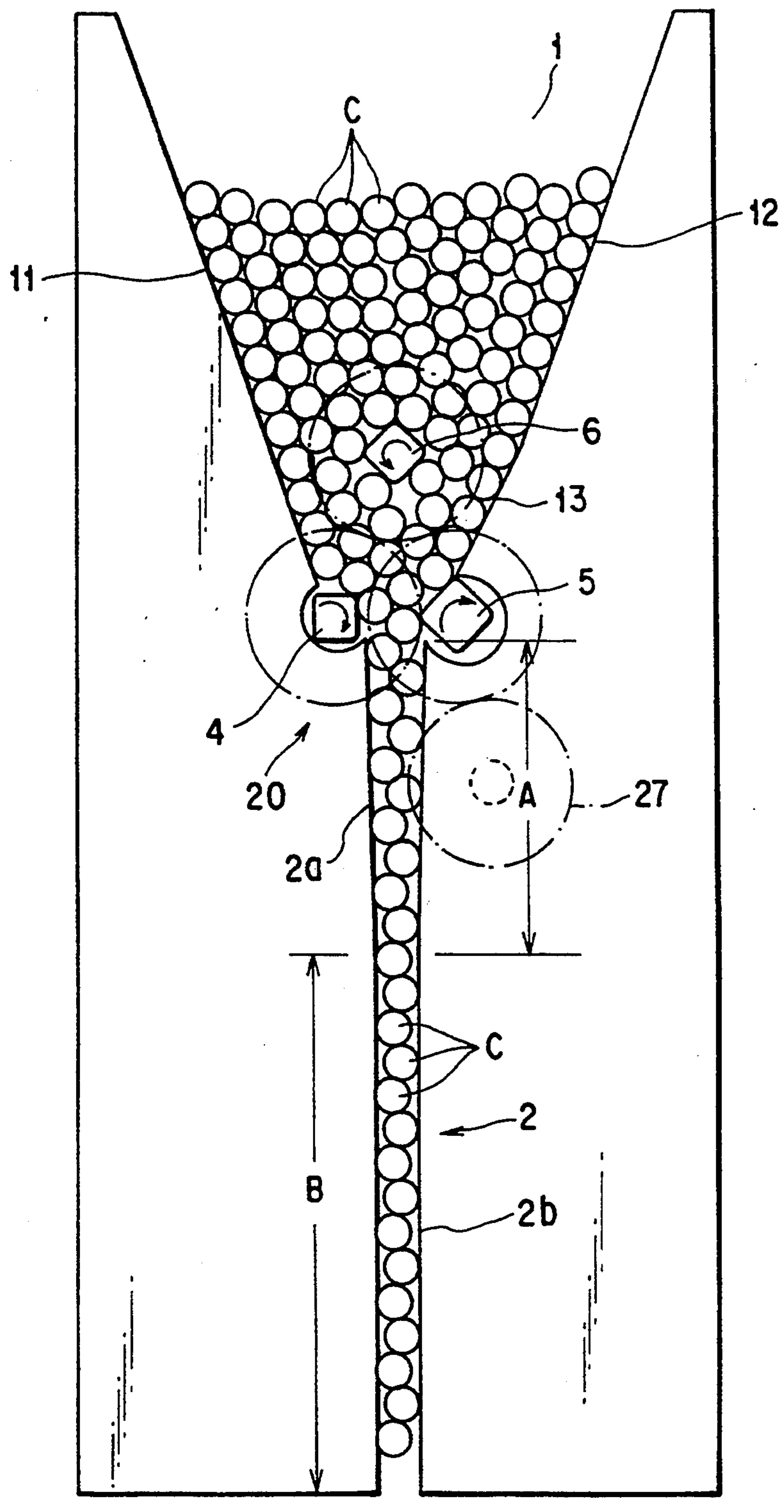
FIG. 2 is a front view of the apparatus.

The above-mentioned structural components of the embodiment will be described in more detail with reference to FIGS. 2 through 4. The funnel shape of the hopper 1 is defined by the right and left side walls 11 and 12. The lower portion 13 of one side wall 12 is slanted at a different angle from that of the lower portion of the other side wall 11. In other words, the lower portions of the hopper 1 is asymmetrical with each other.

The asymmetrical shape of the hopper 1 is advantageous in preventing the bridge phenomenon of cigarettes C from occurring in the bottom region of the hopper 1. In general, the bridge phenomenon occurs if cigarettes are caught by the two side walls and stacked one upon another. In the apparatus of the embodiment, however, the side walls 11 and 13 are asymmetrical with each other, as mentioned above. With this structure, even if the bridge phenomenon occurs, the reactions which the stacked cigarettes receive from the two side walls act in different directions. Since, therefore, the stacked cigarettes C easily collapse, the asymmetric shape of the hopper 1 is effective in preventing the bridge phenomenon.

The entrance agitator rollers 4 and 5, the central agitator roller 6, and the rotating mechanism 20 for rotating the agitator rollers will be explained. Each of the entrance agitator roller 4 and 5 has a non-circular cross section; each of them has a substantially square cross section, for example. One (5) of the entrance agitator rollers has a larger diameter than that of the other (4). The entrance agitator rollers 4 and 5 are rotated in the same direction. In the present embodiment, they are rotated clockwise at the same rotating speed.

The central agitator roller 6 also has a non-circular cross section; it has a substantially square cross section, for example. The diameter of the central agitator roller 6 is substantially the same as that of entrance agitator roller 4. The central agitator roller 6 is rotated in the opposite direction to that of the entrance agitator rollers 4 and 5. In the present embodiment, the central agitator roller 6 is rotated counterclockwise at a different rotating speed from that of the entrance agitator rollers 4 and 5.

With the structure and arrangement of the agitator rollers 4, 5 and 6, the cigarettes C inside the hopper 1 can be fed into the orientation passage 2 smoothly and reliably. To be more specific, since the entrance agitator rollers 4 and 5 are rotated clockwise, the cigarette C that has touched entrance agitator roller 4 is pushed down thereby and guided toward the entrance opening of the orientation passage 2. On the other hand, the cigarette C that has touched entrance agitator roller 5 is pushed up thereby. As a result, a number of cigarettes are prevented from jamming in the neighborhood of the entrance opening.

The cigarettes C located around the central agitator roller 6, i.e., the cigarettes C located in the lower region of the hopper 1, are circulated counterclockwise around the central agitator roller 6. Since the central agitator roller 6 is rotated in the opposite direction to that of the entrance agitator rollers 4 and 5, the cigarettes C located between the three agitator rollers are circulated counterclockwise around the central agitator roller 6, due to the rotations of the entrance agitator rollers 4 and 5. In this manner, the three agitator rollers forcibly circulate the cigarettes around the central agitator roller 6. Since, therefore, the cigarettes in the lower region of the hopper 1 are circulated in the floated condition, they flow smoothly and the occurrence of the bridge phenomenon is reliably prevented.

Due to the operation of the agitator rollers 4, 5 and 6 mentioned above, the cigarettes C can smoothly flow from the hopper 1 into the orientation passage 2, and the cigarettes C can be fed into the orientation passage 2 at high speed.

Since each of the agitator rollers 4, 5 and 6 has a non-circular cross section (e.g., a substantially square cross section), the rotations of the agitator rollers 4, 5 and 6 are effective in guiding the cigarettes C.

The entrance agitator rollers 4 and 5 differ from each other in diameter, and the central agitator roller 6 differs from the entrance agitator rollers 4 and 5 in rotating speed. This means that the three agitator rollers differ in circumferential speed and feed the cigarettes at different rates. Since, therefore, the cigarettes circulating around the central agitator roller 6 can be fully agitated and set in the floated condition, they flow very smoothly. If a group of cigarettes flow without changing their relative positional relationships, it is likely that some of the cigarettes of that group will be stacked on upon another. Such stacked cigarettes would adversely affect the smooth flow of cigarettes, resulting in the occurrence of the bridge phenomenon. In the present invention, this problem is solved by the different circumferential speeds of the agitator rollers 4, 5 and 6. That is, when a group of cigarettes flow, they are agitated by the agitator rollers 4, 5 and 6, thus changing their relative positional relationships. Therefore, the cigarettes of that group can be reliably set in the floated condition, ensuring smooth flow of the cigarettes.

Figure 3:
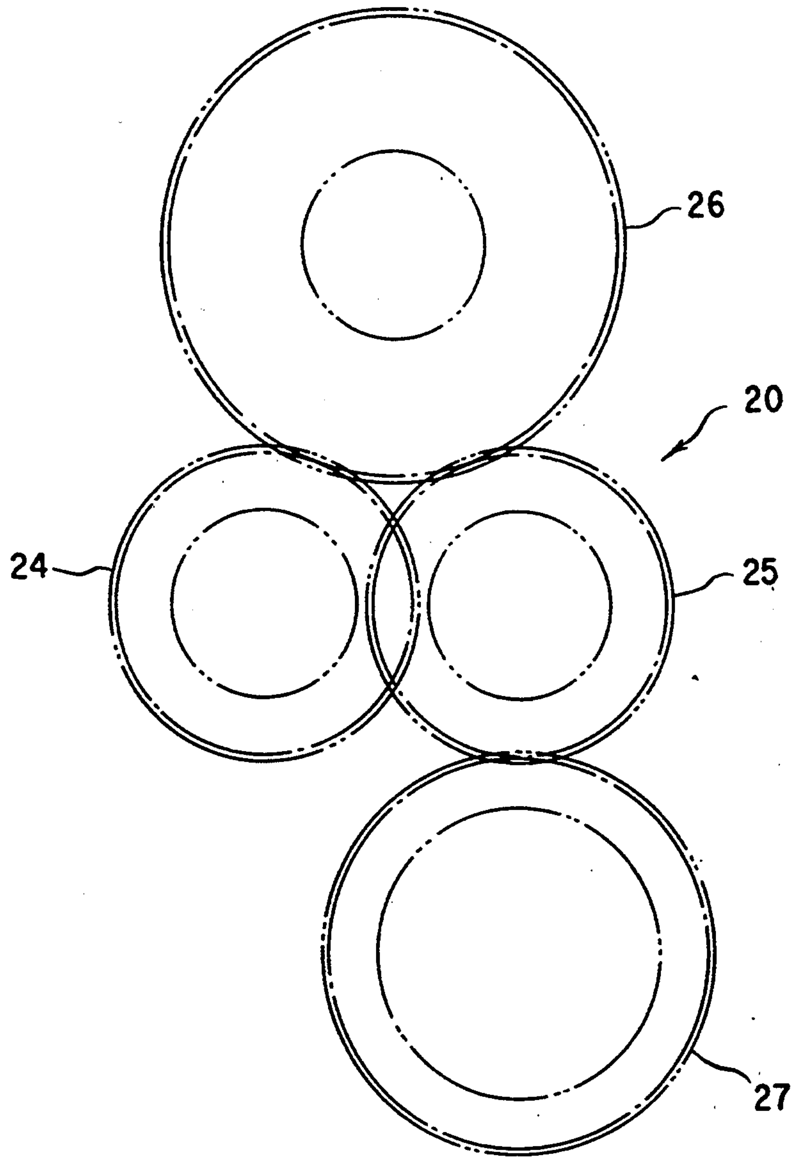
FIG. 3 is an explanatory view of the gear train of a rotating mechanism.
Figure 4:
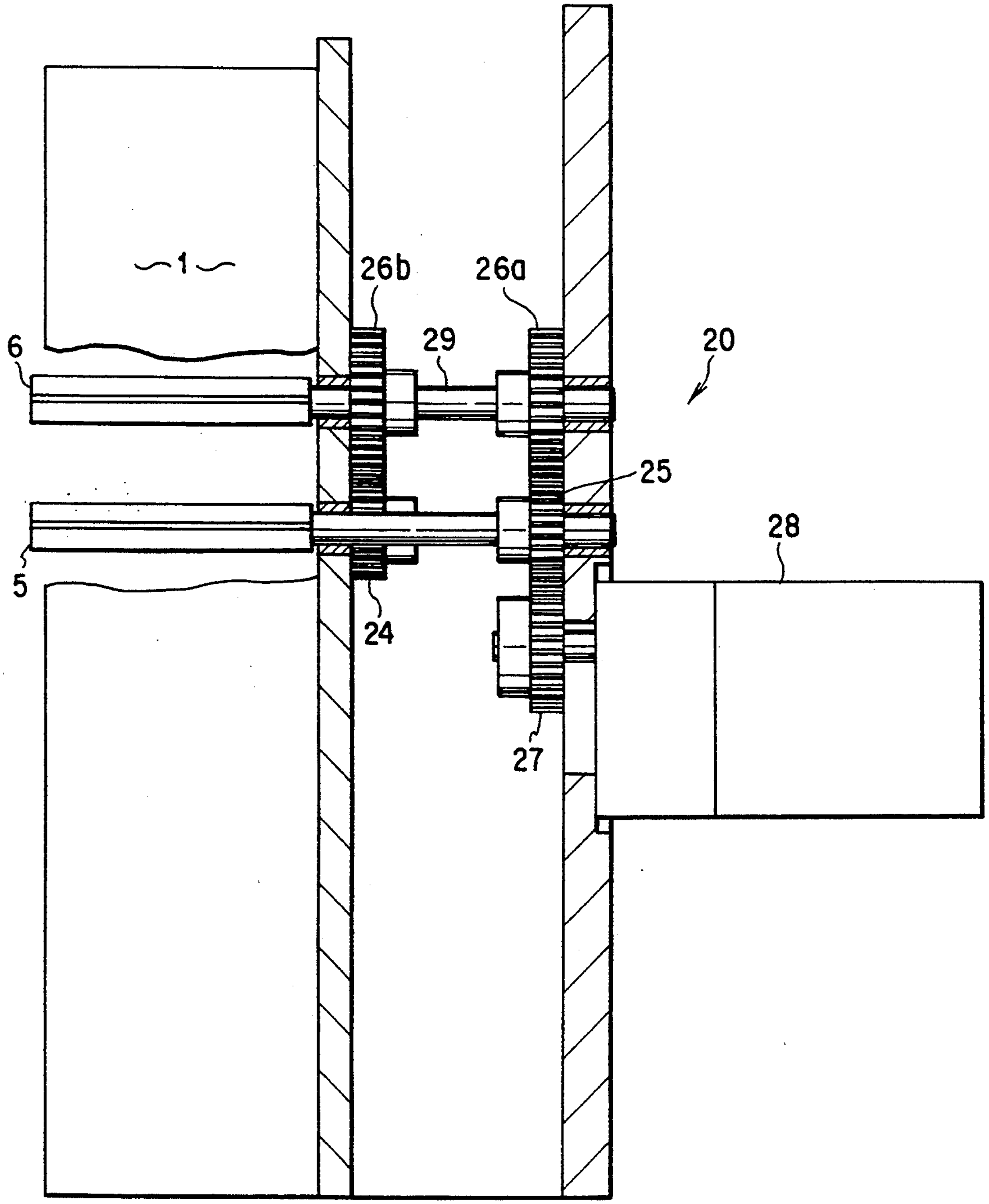
FIG. 4 is a longitudinal sectional view of the rotating mechanism.

The rotating mechanism 20 for rotating the agitator rollers 4, 5 and 6 has such a structure as are shown in FIGS. 3 and 4. Referring to FIGS. 3 and 4, gears 24 and 25 are coupled to the rotating shafts of the entrance agitator rollers 4 and 5, respectively. The gears 24 and 25 are shifted from each other in the axial direction of the rotational shafts, so as to prevent interference between them. One of the two gears, namely gear 25, is in mesh with a gear 27 coupled directly to the rotating shaft of a motor 28.

A pair of gears **26*a* and 26*b* are coupled to the rotating shaft 29 of the central agitator roller 6 such that they are shifted from each other in the axial direction of the shaft 29. One of the paired gears, namely gear 26*a*, is in mesh with gear 25, while the other one of the paired gears, namely gear 26*b*, is in mesh with gear 24**.

When the motor 28 is rotated, entrance agitator roller 5 is rotated clockwise by means of gears 27 and 25. In addition, the central agitator roller 6 is rotated counterclockwise by means of gears 25 and **26*a*. Further, entrance agitator roller 4 is rotated clockwise by means of gear 26*a* (which is coupled to the rotating shaft 29 of the central agitator roller 6) and gear 24. In this manner, the entrance agitator rollers 4 and 5 are rotated clockwise, and the central agitator roller 6 is rotated counterclockwise. In the present embodiment, the dimensions of the gear train are determined such that the rotating speed of the entrance agitator rollers 4 and 5 is 480 rpm and the rotating speed of the central agitator roller 6** is 320 rpm. Since this type of rotating mechanism is simple in structure and does not include a reciprocating mechanism, it does not produce vibration or noise and ensures high-speed rotation.

The structure of the orientation passage 2 will be described in detail with reference to FIG. 2. The upper portion of the orientation passage 2 is a tapered portion **2*a*, and the lower portion thereof is a parallel portion 2*b*. The width of the upper end of the tapered portion 2*a*, i.e., the width of the entrance opening, is about 1.5 times greater than the diameter of the cigarettes C, and the width of the tapered portion 2*a* gradually decreases downward. The width of the parallel portion 2*b* is constant and is about 1.13 times greater than the diameter of the cigarettes C. Where the diameter of the cigarettes C is 8 mm, the width of the parallel portion 2*b*** is about 9 mm.

With this structure of the orientation passage 2, clogging and free fall of cigarettes C in the orientation passage 2 can be prevented. Since the width of the upper end of the tapered portion **2*a*** is about 1.5 times greater than the diameter of the cigarettes C, the cigarettes C in the tapered portion 2*a* are not arranged in a straight line; they are arranged in a zigzag fashion. Per unit length, a large number of cigarettes can be arranged in the zigzag fashion than in the straight fashion. Therefore, even if the cigarettes C temporarily jam or are caught at the entrance opening of the orientation passage or at an intermediate point thereof, what is caused thereby is merely a change in the manner in which the cigarettes C move through the tapered portion 2*a*, that is, the cigarettes that have been moving in the zigzag fashion begin to move in a straight line. In other word, no gap is produced between the cigarettes moving through the orientation passage 2. Therefore, even if the cigarettes temporarily jam or are caught, this in no way results in the free fall of the cigarettes, and scattering of shredded tobacco from the cigarettes can therefore be prevented. In addition, since the cigarettes do not fall or direct their tip ends in a direction greatly different from the originally-orientated direction, the orientation passage 2 is prevented from being clogged.

If the width of the upper end of the tapered portion 2*a* is 1.87 times greater than the diameter of the cigarettes C, two cigarettes are likely to be fed at one time, resulting in clogging. On the other hand, if the upper end of the tapered portion 2*a* is too narrow, the cigarettes C cannot be smoothly fed from the hopper 1 into the orientation passage 2. For this reason, the width of the upper end of the tapered portion, i.e., the width of the entrance opening, should be 1.44 to 1.63 times greater than the diameter of the cigarettes C, preferably about 1.5 times greater than the diameter of the cigarettes C.

The width of the parallel portion 2*b* is about 1.13 times greater than the diameter of the cigarettes C. Since this width is slightly greater than the width required for the cigarettes to smoothly move in a straight line, the cigarettes C moves through the parallel portion 2*b* somewhat in a zigzag fashion. The width of the parallel portion 2*b* is effective in preventing a gap from being produced between the cigarettes C when temporary Jam of the cigarettes occurs. If the parallel portion 2*b* is very wide, the cigarettes C cannot be accurately transferred from the parallel portion 2*b* to the arrangement drum 3. Therefore, it is preferable that the width of the parallel portion be 1.10 to 1.20 times greater than the diameter of the cigarettes C.

If the tapered portion 2*a* of the orientation passage 2 is too short (the length of the tapered portion 2*a* is indicated by A in FIG. 2), the cone angle of the tapered portion 2*a* is wide. In this case, the cigarettes C may be easily stacked one upon another. In addition, since only a small number of cigarettes C are arranged in the tapered portion 2*a*, a gap may be easily produced between the cigarettes. Therefore, the length A of the tapered portion 2*a* is preferably more than ten times greater than the diameter of the cigarettes C, so as to permit more than ten cigarettes C to be arranged in the tapered portion 2*a*.

The present invention is not limited to the embodiment mentioned above, and can be modified in various manners. For example, the mechanism for rotating the agitator rollers does not have to be the type mentioned above. In addition, each agitator roller need not have a substantially square shape; it may be in the shape of a polygon, an ellipsoid, a star, or the like. Needless to say, the present invention is not limited to an orientation/feeding apparatus for cigarettes and is applicable to an orientation/feeding apparatus for rod-like objects of any type.

As detailed above, according to the present invention, the rod-like objects in the hopper can flow smoothly and can be fed into the orientation passage reliably and at high speed. Even if the rod-like objects temporarily jam in the orientation passage, no gap is produced between the rod-like objects moving through the orientation passage. Therefore, free fall of the rod-like objects is prevented, and damage to the rod-like objects and clogging in the orientation passage are therefore prevented. In addition, since the agitator rollers are rotated continuously, the mechanism for rotating them is simple in structure, does not produce vibration or noise, and is capable of rotating the agitator rollers at high speed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for orientating and feeding a large number of rod-like objects, comprising:

- a hopper for containing rod-like objects arranged at random;
- an orientation passage, open in a bottom of the hopper, for feeding the rod-like objects in an orientated state, said orientation passage having an entrance opening which communicates with an internal region of the hopper and which has a width greater than a diameter of the rod-like objects, said orientation passage being tapered and decreasing in width in a direction away from the entrance opening;
- a pair of rotatable entrance agitator rollers located on opposite sides of the entrance opening of the orientation passage, said entrance agitator rollers having a non-circular section;
- a rotatable central agitator roller arranged in a lower region of the hopper and located above the entrance agitator rollers, said central agitator roller having a non-circular section; and
- rotating means for rotating the central and entrance agitator rollers, said rotating means rotating the entrance agitator rollers in the same direction and rotating the central agitator roller in an opposite direction to that of the entrance agitator rollers.

2. The apparatus according to claim 1, wherein at least one of the central agitator roller and entrance agitator rollers has a diameter different from that of the others.

3. The apparatus according to claim 2, wherein one of the entrance agitator rollers has a diameter larger than that of the other entrance agitator roller and the central agitator roller.

4. The apparatus according to claim 1, wherein at least one of the central agitator roller and entrance agitator rollers is rotated at a speed different from that of the others.

5. The apparatus according to claim 4, wherein said entrance agitator rollers are rotated at the same rotating speed, and said central agitator roller is rotated at a speed lower than that of the entrance agitator rollers.

6. The apparatus according to claim 1, wherein side walls in the lower region of the hopper are tapered and become closer to each other in a downward direction, and one of said side walls is slanted at a different angle from that of the other.

7. The apparatus according to claim 1, wherein said entrance opening of the orientation passage has a width approximately 1.5 times greater than the diameter of the rod-like objects, and said orientation passage has a tapered upper portion which decreases in width in a downward direction.

8. The apparatus according to claim 7, wherein the tapered upper portion of the orientation passage has a length more than ten times greater than the diameter of the rod-like objects.

9. An apparatus for orientating and feeding a large number of rod-like objects, comprising:

a hopper for containing rod-like objects arranged at random;

an orientation passage, open in a bottom of the hopper, for feeding the rod-like objects in an orientated state, said orientation passage having an entrance opening which communicates with an internal region of the hopper and which has a width greater than a diameter of the rod-like objects, said orientation passage being tapered and decreasing in width in a direction away from the entrance opening, said entrance opening of the orientation passage having a width approximately 1.5 times greater than the diameter of the rod-like objects, and said orientation passage having a tapered upper portion which decreases in width in a downward direction, said tapered upper portion of the orientation passage having a length more than ten times greater than the diameter of the rod-like objects;

a pair of rotatable entrance agitator rollers located on opposite sides of the entrance opening of the orientation passage;

a rotatable central agitator roller arranged in a lower region of the hopper and located above the entrance agitator rollers; and rotating means for rotating the central and entrance agitator rollers, said rotating means rotating the entrance agitator rollers in the same direction and rotating the central agitator roller in an opposite direction to that of the entrance agitator rollers.

10. The apparatus according to claim 9, wherein at least one of the central agitator roller and entrance agitator rollers has a diameter different from that of the others.

11. The apparatus according to claim 10, wherein one of the entrance agitator rollers has a diameter larger than that of the other entrance agitator roller and the central agitator roller.

12. The apparatus according to claim 9, wherein at least one of the central agitator roller and entrance agitator rollers is rotated at a speed different from that of the others.

13. The apparatus according to claim 12, wherein said entrance agitator rollers are rotated at the same rotating speed, and said central agitator roller is rotated at a speed lower than that of the entrance agitator rollers.

14. The apparatus according to claim 9, wherein each of said entrance agitator rollers and central agitator roller has a non-circular cross section.

15. The apparatus according to claim 9, wherein side walls in the lower region of the hopper are tapered and become closer to each other in a downward direction, and one of said side walls is slanted at a different angle from that of the other.

* * * * *